United States Patent

[11] 3,577,143

| [72] | Inventors | Joseph L. Poirier<br>26 Brian Road;<br>John K. Schindler, 6 Nevada Drive,<br>Chelmsford, Mass. 01824 |
|---|---|---|
| [21] | Appl. No. | 814,334 |
| [22] | Filed | Apr. 8, 1969 |
| [45] | Patented | May 4, 1971 |

[54] EXTENDED RANGE SPECTRUM ANALYSIS RADAR
13 Claims, 3 Drawing Figs.

| [52] | U.S. Cl. | 343/12R, 343/14, 343/17.5 |
|---|---|---|
| [51] | Int. Cl. | G01s 9/24 |
| [50] | Field of Search | 343/5, 12, 14, 17.5 |

[56] References Cited
UNITED STATES PATENTS

| 2,958,862 | 11/1960 | Rey | 343/14 |
|---|---|---|---|
| 3,343,164 | 9/1967 | Clarke | 343/14 |
| 3,355,734 | 11/1967 | Albanese | 343/14 |
| 3,495,243 | 2/1970 | Russell | 343/14 |

*Primary Examiner*—Malcolm F. Hubler
*Attorneys*—Harry A. Herbert, Jr. and George Fine ABSTRACT: A radar system in which the return signal is added to a reference signal derived from the original transmitted signal. The power spectrum of the sum signal is modulated. The modulation frequency is a linear function of the range and is measured to determine the range to the target. To extend the maximum range of the system the reference signal is delayed relative to the received signal, and to decrease the minimum range the received signal is delayed relative to the reference signal.

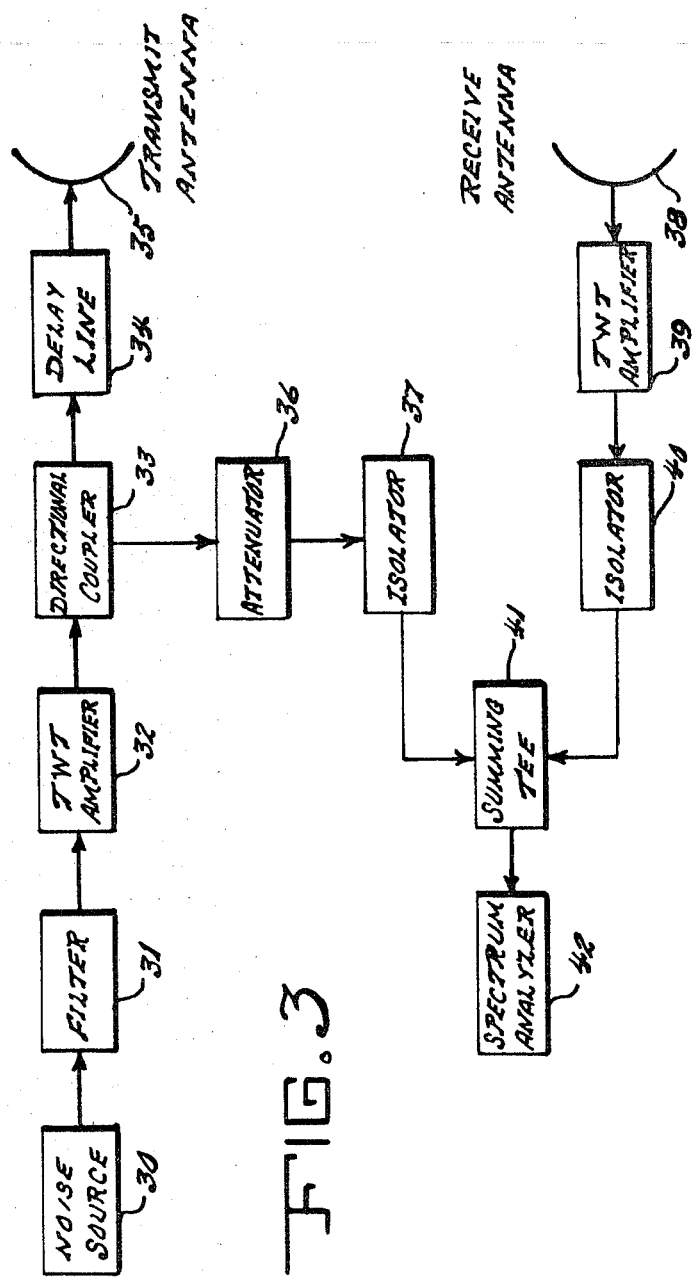
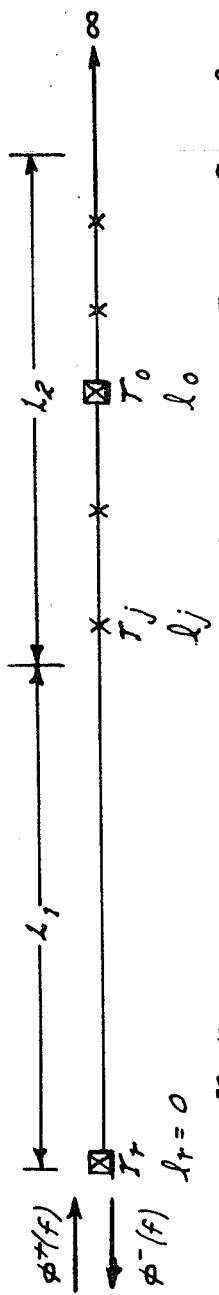

EXTENDED RANGE SPECTRUM ANALYSIS RADAR

CROSS-REFERENCE TO RELATED APPLICATION

In a prior United States patent application by Joseph L. Poirier entitled "Spectrum Analysis Radar System" filed 23 July 1968 bearing serial number 746,956 there was disclosed a radar system in which the location of modulation nulls depended on the exact electrical range to the target of interest. The present invention utilizes the basic concept taught therein but further includes means to extend the maximum range thereof and also to decrease the minimum range.

BACKGROUND OF THE INVENTION

This invention relates to a radar system and more particularly to a spectrum analysis radar system in which a delay is introduced between the received signal and a reference signal to provide an extended maximum range and a decreased minimum range.

In the prior art spectrum analysis radar system, the returned target signal is added to a reference signal derived from the original transmitted signal. Under certain conditions, the power spectrum of this sum signal is modulated. The modulation frequency is a linear function of the range and can be measured to determine the range to the target of interest. This modulation persists even if there is no modulation on the transmitted signal. The only requirements are that the transmitted signal be time stationary (i.e., a noiselike signal) and that the range to the target be equal to or greater than the ratio of the speed of light to the bandwidth of the signal.

The present invention is an improvement of the aforementioned spectrum analysis radar system which allows its useful range to be extended. The minimum range of the spectrum analysis radar is determined by the bandwidth of the transmitted signal while its maximum range is determined by the resolution of the spectrum analyzer included in the system. This invention removes both of these restrictions and allows the maximum range to be increased or the minimum range to be decreased even down to zero.

SUMMARY OF THE INVENTION

In the conventional spectrum analysis radar the range to the target is determined by measuring the frequency difference between the modulation nulls in the power spectrum of the sum signal. However, as the frequency difference between nulls approaches the spectrum analyzer resolution, the nulls will be washed out. At this point the maximum useful range has been reached.

The important point is that the power spectrum modulation of the sum signal depends only on the relative delay between the reference signal and the received signal. The reference signal is delayed a predetermined amount relative to the received signal. This means that the range to a target as measured by the null pattern will be the difference between the actual range and the "delayed range." But more important, the frequency difference between the nulls will have increased by an amount proportional to the "delayed range" thereby again making the range resolvable on the spectrum analyzer. In order to decrease the minimum range of the conventional spectrum analysis radar, the received signal is delayed relative to the reference signal. This means that the range to a target as measured by the null pattern will be the sum of the "delayed range" and the "target range." But since the "delayed range" is known, the target range can be determined by measuring the frequency difference between nulls and the radar will now be useful down to zero range.

An object of the present invention is to provide an improved spectrum analysis radar system with an extended maximum range by delaying the reference signal relative to the received signal.

Another object of the present invention is to provide an improved spectrum analysis radar system with a decreased minimum range by delaying the received signal relative to the reference signal.

Although the novel features which are believed to be characteristic of this invention will be particularly pointed out in the claims appended hereto, the invention itself as to its objects and advantages, the mode of its operation and its organization may better be understood by referring to the following description taken in conjunction with the accompanying drawings forming a part thereof.

BRIEF DESCRIPTION OF THE DRAWINGS

FIG. 1 is a pictorial representation of spectrum analysis radar system parameters;

FIG. 3 is a block diagram representation of a spectrum analysis radar system having a decreased minimum range down to zero.

Figure 2:
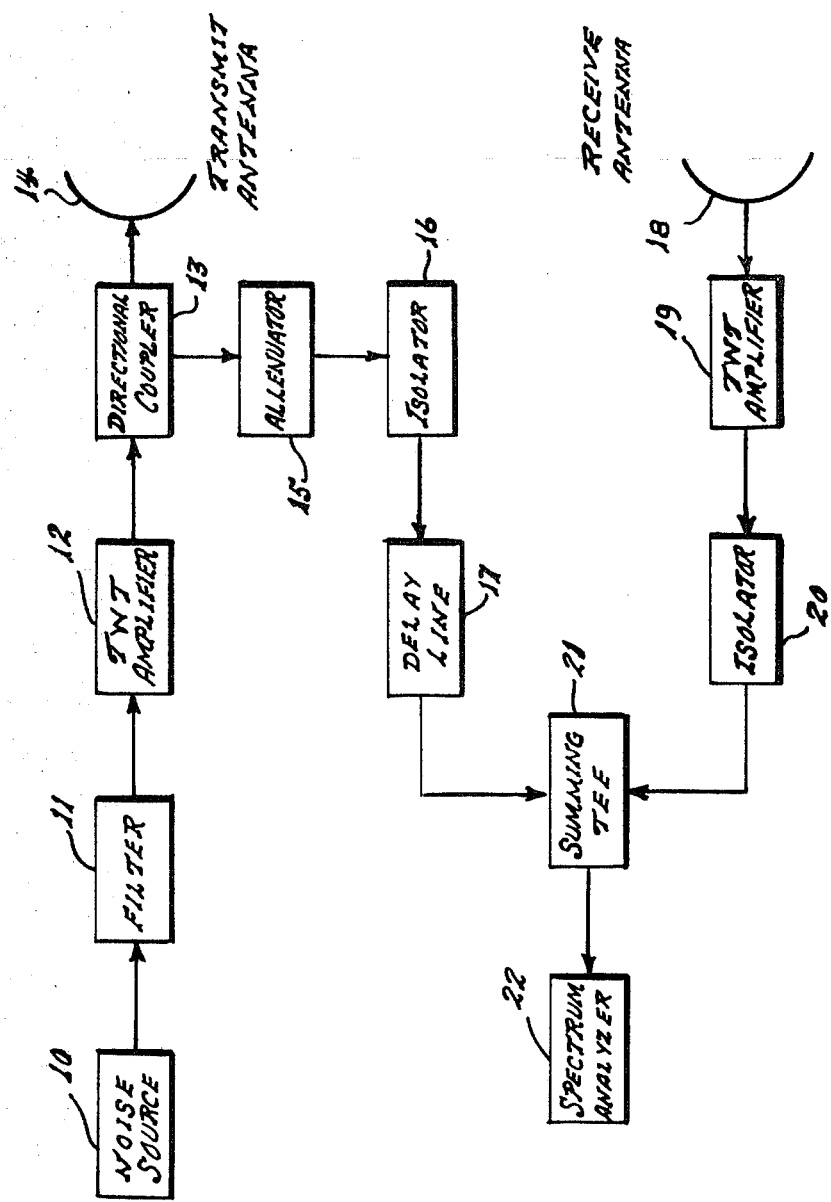
FIG. 2 is a block diagram representation of a spectrum analysis radar system having an extended maximum range.

To completely describe the system of the present invention, the following theory is presented. The scattering of broadband signals from an array of randomly spaced discontinuities in a long transmission line was analyzed. Probability density functions for the power reflection coefficient at the input of the transmission line were obtained along with expressions for the mean and variance of the power reflection coefficient. In these analyses, only the total intensity of the reflected signals was studied. It turns out, however, that under certain conditions, depending principally on the bandwidth of the illuminating signal and the spacing between adjacent discontinuities, the power spectrum of the total reflected signal is modulated. This modulation is not the result of any modulation of the illuminating signal and in fact occurs for unmodulated signals as well. It depends only on the random nature of the stationary quasimonochromatic illuminating signal.

Measurements have been made for two signal components (corresponding to two discontinuities) in which case the modulation frequency depends only on the relative path length difference between the two signals while the fractional modulation amplitude depends on their relative intensities.

The analysis of the scattering of stationary quasimonochromatic signals from an array of small discontinuities was extended to include the spectral characteristics of the total reflected signal. A result of this analysis is that under certain conditions the range, magnitude, and phase of a distant reflector can be determined from the power spectrum of the reflected signal. Because of this, the application of power spectrum analysis to a radar is provided. Expressions are obtained for the useful range and resolution of such a radar and a comparison between its resolution and that of a conventional pulse radar is made. Particularly the use of this system to measure angular location of a target is described and claimed.

Although the theory can be applied to more complex problems, only the one dimensional case of an array of scatterers in a long transmission line will be treated. Consider a line of length L along which are distributed N scatterers with an average spacing L/N which is much greater than the mean wavelength $\lambda_o$ of the radiation. The voltage reflection coefficient $\Gamma_j$ of each scatterer is assumed to be small enough to satisfy the condition that $N|\Gamma_j|^2 \ll 1$. These two restrictions insure that multiple interaction effects can be neglected although the latter restriction is easily removed. Also, the individual reflection coefficients are assumed to be constant over the bandwidth $\Delta f$ of the illuminating signal which must satisfy the quasimonochromatic approximation ($\Delta f/f_o) \ll 1$. It is also assumed that the illuminating radiation is ergodic and time stationary so that ensemble averages may be replaced by suitably long time averages which depend only on time differences.

When the line is illuminated by a signal $V^+(t)$ having a normalized (unit area) power spectrum $\Phi^+(f)$, the total reflected voltage $V^1(t)$ at the input to the line is given by $$V^-(t) = \sum_{j=1}^{N} \Gamma_j \exp\left[-2\alpha l_j\right] V^+(t-t_j) \qquad (1)$$

where $\alpha$ is the attenuation constant of the line. The time $t_j$ is the total time required for the signal to reach the $j$th reflector and return to the input of the line and is equal to $2l_j/v$ where $l_j$ is the distance to the $j$th reflector and $v$ the propagation velocity.

The complex autocorrelation of Eq. (1) is given by $$\langle V^-(t+f)V^{-*}(t)\rangle$$

$$\sum_{k=1}^{N}\sum_{j=1}^{N}\Gamma_k\Gamma_j^* \exp[-2\alpha\{l_k+l_j\}]$$

$$\langle V^+(t-t_R+f)V^{+*}(t-t_j)\rangle \quad (2)$$

where the sharp brackets indicate the infinite time average associated with the autocorrelation and the new summation index $k$ has been used to account for all the cross terms. The terms within the angular brackets in Eq. (2) are by definition, the self coherence functions $\Gamma^-(\tau)$ and $\Gamma^+(\tau)$ of the reflected and incident signals $V^-(t)$ and $V^+(t)$, respectively. That is $$\Gamma^-(f) = \langle V^-(t+f)V^{-*}(t)\rangle \quad (3)$$

where $\tau$ is the time delay introduced in the correlation. The normalized form of $\Gamma^-(\tau)$ or the complex degree of self-coherence is given by $$\gamma^-(f) = \frac{\Gamma^-(f)}{\Gamma^-(o)} = \frac{\Gamma^-(f)}{I^-} \quad (4)$$

where $I^-$ is the time averaged intensity of the total reflected signal. Furthermore, the complex degree of self-coherence and the normalized power spectrum of the signal form a Fourier transform pair so that $$\gamma^-(f) = \int_0^\infty \phi^-(f) \exp[-j2\pi f t]df \quad (5)$$

Equations (3), (4), and (5) when applied to both sides of Equation (2) yield $$I^-\phi^-(f) = \sum_{k=1}^{N}\sum_{j=1}^{N}|\Gamma_k||\Gamma_j|\exp[-2\alpha\{l_R+l_j\}]I^+\phi^+(f)\ldots$$

$$\cos[2\pi f\{t_j-t_R\}+\theta_j-\theta_R] \quad (6)$$

where $\theta_m$ and $\theta_k$ are the phases associated with the voltage reflection coefficient of the $j$th and $k$th reflectors.

If the round trip path length difference between any pair of reflectors is much smaller than the coherence length $l_c=v/\Delta f$, the argument of the cosine term in Equation (6) will principally depend on $\{t_j-t_k\}$ over the bandwidth $\Delta f$ and $f$ may be replaced by the mean frequency $f_0$. Under these conditions Equation (6) when integrated over all frequencies yields $$I^- = \sum_{k=1}^{N}\sum_{j=1}^{N}|\Gamma_k||\Gamma_j|\exp[-2\alpha\{l_k+l_j\}]I^+\ldots$$

$$\cos[2\pi f_0\{t_j-t_k\}+\theta_j-\theta_k] \quad (7)$$

and $$\phi^-(f) = \phi^+(f) \quad (8)$$

Equations (7) and (8) are the well known interference laws for coherent signals ($v|t_j-t_k|<<v/\Delta f$).

Conversely, if $|t_j-t_k|<<1/\Delta f$ integration of Equation (6) will cause the cosine terms to vanish, except when $j=k$ in which case we obtain $$I^- = \sum_{j=1}^{N}|\Gamma_j|^2 I^+ \exp[-4\alpha l_j] \quad (9)$$

Equation (9) is of course the law of incoherent addition of signal powers. The power spectrum of the total reflected signal in this case however is $$\phi^-(f) = \phi^+(f)\frac{I^+}{I^-}\sum_{k=1}^{N}\sum_{j=1}^{N}|\Gamma_k||\Gamma_j|\exp[-2\alpha\{l_j+l_k\}]\ldots$$

$$\cos[2\pi f\{t_j-t_k\}+\theta_j-\theta_k] \quad (10)$$

Equation (10) indicates that the power spectrum of the total reflected signal is modulated and that the modulation frequencies depend only on the relative time delays $|t_j-t_k|$ corresponding to the path length delays $|l_j-l_k|$. The frequency difference $\Delta f_m$ between successive nulls $f_n$ in $\Phi^-(f)$ due to a component pair is easily shown to be from Equation (10)

$$\Delta f_m = \frac{1}{|t_j-t_k|} = \frac{v}{2|l_j-l_k|} \quad (11)$$

The modulation occurs at $N(N-1)/2$ different frequencies corresponding to all possible distinct pair values of $j$ and $k$.

The fractional modulation amplitude $M_{jk}$ of each component pair depends on their relative intensities and is given by $$M_{jk} = \frac{I_{max.}-I_{min.}}{I_{max.}+I_{min.}} = \frac{2\Gamma_j\Gamma_k I^+}{I^-}\exp[-2\alpha\{l_j+l_k\}] \quad (12)$$

where $I_{max}$ and $I_{min}$ are adjacent maximum and minimum values of the power spectrum. The phases $\theta_j$ of the reflectors fix the absolute location $f_n$ of the nulls in the power spectrum.

At this time it should be pointed out that the ratio $I^+/I^-$ in Equation (12) and elsewhere is the reciprocal of the power reflection coefficient R at the input to the line. Expressions for R and $p(R)$ the probability density function for R when the scatterers are randomly distributed exist. If the line is incoherently illuminated ($l_c<<|l_j-l_k|$) the result is $$R = \frac{I^-}{I^+} = \sum_{j=1}^{N}|\Gamma_j|^2 \exp[-4\alpha l_j] \quad (13)$$

In the partially coherent case Equation (13) is much more complicated and R depends on $\gamma^+(\tau)$.

To demonstrate the application of Equation (10), consider a long transmission line with only two reflectors $\Gamma_1'$ and $\Gamma_2'$ located at $l_1=0$ and $l_2$ respectively. For convenience, the signal attenuation has been lumped into the voltage reflection coefficient, i.e., $\Gamma_2' = |2| \exp[-2\alpha l_2]$. If $v/\Delta f_2$, Equation (13) can be used to write Equation (10) as $$\phi^-(f) = \phi^+(f)\left\{\frac{1+2|\Gamma_1'||\Gamma_2'|}{|\Gamma_1'|^2+|\Gamma_2'|^2}\cos\left[\frac{4\pi f l_2}{v}+\theta_2-\theta_1\right]\right\}$$

$$\quad (14)$$

The frequency difference between nulls $\Delta f_m$, the fractional modulation amplitude $M_{12}$, and the absolute location $f_n$ of the nulls can be determined by measuring $\phi^-(f)$ with a spectrum analyzer. From these measurements there results $$l_2 = \frac{v}{2\Delta f_m} \quad (15)$$

and $$\Gamma_2' = \left\{\frac{1+\sqrt{1-M_{12}^2}}{M_{12}}\right\}\Gamma_1' \quad (16)$$

from which $|\Gamma_2|$ may be obtained by using Equation (15).

The phase of $\Gamma_2$ to within an uncertainty of $2\pi$ is found to be $$\theta_2 = \theta_1 + \left[2l1+1-\frac{2f_n}{\Delta f_m}\pi, \quad l1=0, \quad \pm 1, \ldots\right] \quad (17)$$

Because the location and characteristics of a distant reflector (target) can be determined from the power spectrum of the superposition of the reflected signal and part of the illuminating signal (derived from $\Gamma_1$ in the two reflector example) this system is in effect a radar.

FIG. 1 pictorially illustrates the application of power spectrum analysis to a radar problem in which a target $\Gamma_o$ at a range $l_o$ is immersed in clutter scatterers (assumed to be all equal) and $$L_1 \geq l_o = \frac{c}{\Delta f}$$

A portion of the transmitted signal $\Gamma_r V^+(t)$ is used as the reference signal so that $l_r=0$. For convenience the effects of free space attenuation are included in $\Gamma_o$ and the $\Gamma_j$ and the phase $\theta_r$ of the reference signal $\Gamma_r V^+(t)$ is set equal to zero.

In the absence of clutter, measurement of $\phi^-(f)$ would yield $l_o$, $|\Gamma_o|$ and $\theta_o$ directly, analogous to the two reflector problems described by Equations (14) through (17). However, in the presence of clutter, Equation (10) will contain modulation components corresponding to $l_o$ plus all other combinations of scatterer ranges $l_j$ and $l_k$. The frequency difference between nulls for the terms involving $l_o-l_r$ and $l_j-l_r$ where $l_j$ is the range to one of the scatterers and $l_r=0$ is given by Equation (11). Those terms depending on the differences $|l_o-l_j|$ and $|l_j-l_k|$ may or may not produce modulations. If the coherence length $l_c=c/\Delta f \leq L_2/N$, modulations will be produced. While if $l_c$ is much greater than the interscatterer spacing Equation (8) applies and no modulation is observed. Since the desired information is contained in the term $l_o-l_r$, the latter condition seems preferable. But there is yet another factor to be considered also effecting system performance, so it is not now possible to choose the conditions for best operation. However, if the cross-term modulations are present, they will be far removed in frequency from the fundamental modulation frequencies.

The fractional modulation amplitudes are given by Equation (12) and are $$M_{jk}=\frac{2\Gamma_j\Gamma_k I^+}{I^-} \quad (18)$$

$$M_{jo}=\frac{2\Gamma_j\Gamma_o I^+}{I^-} \quad (19)$$

$$M_{jr}=\frac{2\Gamma_j\Gamma_r I^+}{I^-} \quad (20)$$

$$M_{ro}=\frac{2\Gamma_r\Gamma_o I^+}{I^-} \quad (21)$$

If the reasonable assumptions that $\Gamma_o \gg \Gamma_j$, $\Gamma_r \gg \Gamma_j$ and $N \gg 1$ are made, $M_{jk}$, $M_{jo}$, and $M_{jr}$ will each be much smaller than $M_{ro}$. Thus a separation of the target return from the clutter return has been effected. This occurs because the modulation frequencies (due to the clutter) each with a small amplitude will be distributed more or less at random around the target frequency. The result then is a smearing of the modulations in the power spectrum; but the target modulation having a large amplitude will still dominate so long as $N \Gamma_j^2$ is not too large.

The denominator $I^-$ appearing in Equations (18) through (21) is the total intensity of the reflected signal. If $l_c$ is larger than the average interscatterer spacing $L_2/N$, $I^-$ can vary widely from one observation to another as the phases of the clutter components change due to antenna or other motion. If the converse is true then $I^-$ will not depend on the phases of the components (Equation(9)) but be constant and equal to the mean intensity of the previous case. The most consistent measurements would then be obtained when $I^-$ is constant and $l_c$ smaller than the interscatterer spacing thereby decorrelating the clutter return components.

Under these conditions, Equation (21) becomes $$M_{ro}=\frac{2|\Gamma_r||\Gamma_o|}{|\Gamma_r|^2+|\Gamma_o|^2+|\Gamma_c|^2} \quad (22)$$

where $|\Gamma_c|^2$ is the total clutter power and equal to $(N-2)|\Gamma_j|^2$. If $\Gamma_r$ is made variable, the target modulation amplitude will be maximum when $|\Gamma_r|^2=|\Gamma_o|^2+|\Gamma_c|^2$. Equation (22) would then be $$M_{ro_{max}}=\frac{|\Gamma_o|}{\{|\Gamma_o|^2+|\Gamma_c|^2\}^{1/2}} \quad (23)$$

At this point, expressions for the useful range and resolution of this system should be obtained in order to make more meaningful comparisons with conventional radars. Consider the system in which a Gaussian noise signal is used to illuminate a target 13. Part of the transmitted signal is added to the signal reflected from the target and observed on a spectrum analyzer. Now the sum signal spectrum analyzer output is passed through detector and high-pass filter, the original sum spectrum will be converted to a new time function. A second spectrum analyzer can now be used to determine the frequency components present in the new time function. The following definitions for the useful range and resolution are based on a system of this type with the illuminating signal spectrum $\Phi^+(f)$ given by $$\phi^+(f)=\frac{1}{\sigma\sqrt{2\pi}}\left[\exp-1/2\left(\frac{f_o-f}{\sigma}\right)^2\right] \quad (24)$$

For a single target with the reference signal adjusted to be equal to the target return signal the sum spectrum is $$\phi^-(f)=\frac{1}{\sigma\sqrt{2\pi}}\exp\left[-1/2\left(\frac{f_o-f}{\sigma}\right)^2\right]\left\{1+\cos\frac{4\pi fR}{c}\right\} \quad (25)$$

and the new time function becomes after high-pass filtering $$\bar{\varphi}^-(t)=\frac{K}{\sigma\sqrt{2\pi}}\exp\left[-1/2 S_s^2\left(\frac{t_o-t}{\sigma}\right)^2\right]\frac{\cos 4\pi R S_s t}{c} \quad (26)$$

where $S_s$ is the sweep speed of the sum signal spectrum analyzer. The spectrum of Equation (26), which is the product of two time functions, is the convolution of the spectra of the component time functions and results in a spectrum with a variance $o$ centered at the modulating frequency $f_m=2RS_s/c$.

The variance $o$ is a function only of the variance of the illuminating signal $o$ and can be obtained by finding the transform of $$\exp\left[-1/2 S_s^2\left(\frac{t_o-t^2}{\sigma}\right)\right]$$

The result is $$\sigma'=\frac{S_s}{2\pi\sigma} \quad (27)$$

From Equation (27) the range resolution $\Delta R$ can be defined. Two targets can just be resolved if their modulation frequencies $f'_m$ are separated by the width $2o$ of the spectral line. Therefore, $$\Delta R=2o\frac{dR}{df_m'}=\frac{C}{2\pi\sigma} \quad (28)$$

The maximum useful range $R_{max}$ is determined by the effective IF bandwidth $\Delta f_a$ of the sum signal spectrum analyzer. To obtain good modulation characteristics $\Delta f_m \geq 10 \Delta f_a$ so that the maximum range then is $$R_{max.}=\frac{c}{20\Delta f_a} \quad (29)$$

The minimum range depends on the coherence length of the radiation since the range must be sufficiently great so that the reflected signal is no longer correlated with the reference signal this condition can be written as $$R_{min.}=l_o=\frac{c}{\Delta f} \quad (30)$$

A comparison between the resolution of a conventional pulse radar and a spectral analysis radar can now be made. The resolution of a pulse radar can be expressed as $$\Delta R_p=\frac{c\tau}{2}$$

where $\tau$ is the pulse width. The transform of a pulse is a function of the form $(\sin x)/x$ which yields a power spectrum of the form $(\sin^2 x)/x^2$. The normalized power spectrum of a pulse then is $$\phi^+(f)=\frac{1}{\pi}\frac{\sin^2 2\pi f}{(2\pi f)^2} \quad (31)$$

and the power contained in the main lobe is $$P_\text{D} = \frac{2}{\pi} \int_0^\pi \frac{\sin^2 2\pi f}{(2\pi f)^2} d(2\pi f) \qquad (32)$$

Numerical integration of Equation (32) yields approximately $P_p = 0.90$. To compare $\Delta R$ to $\Delta R_p$, the frequency spread of the Gaussian is restricted so that only those frequencies which make up 0.90 of the total power are considered. The frequency extreme may be found by using the relation $$\frac{2}{\sqrt{\pi}} \int_0^{x_0} \exp[-x^2] dx = 0.90 \qquad (33)$$

and solving for $x_o$. From tables, $x_o = 1.18$ and the relative amplitude of $exp[-x^2]$ at $x=x_o$ is found to be 0.25 from which the required frequency extreme in Equation (24) can be found in terms of $\delta$. Matching the frequency extreme in the pulse and Gaussian spectra there results $1/\tau = 1.666$. The ratio of the resolution then is $$\frac{\Delta R_\text{p}}{\Delta R} = \pi \Sigma \sigma = 1.88 \qquad (34)$$

Equation (34) indicates that a spectrum analysis radar operating with a bandwidth equivalent to a conventional pulse radar offers an 88 percent improvement in resolution.

Now referring in detail to FIG. 2, there is shown noise source 10 which is a generator providing a stationary time signal such as unmodulated noise. The noise signal is fed to traveling wave tube 12 amplifier by way of filter 11. The amplified noise signal is passed through directional coupler 13 to transmit antenna 14 which directs it toward a target of interest.

The reflected signal from the target of interest is received by antenna 18 which is then passed through traveling wave tube amplifier 19 to isolator 20. From isolator 20 the reflected amplified signal is fed to summing tee 21. Simultaneously summing tee 21 receives a reference signal by way of directional coupler 13, attenuator 15, and isolator 16. The output from summing tee 21 is fed to spectrum analyzer 22. Component 17 has a predetermined delay.

It is noted that maximum response occurs when the reference signal is equal in magnitude to the reflected signal at the point of summation. It is also emphasized that the bandwidth of filter 11 should be at least equal to the ratio of the speed of light divided by the range to the target; otherwise, no modulation of the power spectrum will occur.

In further explanation of the system of FIG. 2, aside from the delay line, it is a spectrum analysis radar in which the range to a target is determined by measuring the frequency difference between the modulation nulls in the power spectrum of the sum signal. However, as the frequency difference between nulls approaches the spectrum analyzer resolution, the nulls will be washed out. At this point the maximum useful range has been reached (see equation 29).

The important point is that the power spectrum modulation of the sum signal depends only on the relative delay between the reference signal and the received signal. Therefore, if an artificial delay is introduced between the directional coupler and the summing tee, it has the effect of delaying the reference signal relative to the received signal. This means that the range to a target as measured by the null pattern will be the difference between the actual range and the "delayed range." But more important, the frequency difference between the nulls will have increased by an amount proportional to the "delayed range" thereby again making the range resolvable on the spectrum analyzer.

The delaying mechanism can be any one of the standard devices such as a delay line or long coaxial cable and can be inserted in any way which will effectively delay the reference signal relative to the received signal.

Now referring to FIG. 3, there is shown noise source 30 which is a generator providing a stationary time signal such as unmodulated noise. The noise signal is fed to traveling wave tube amplifier 31 by way of filter 31. The amplified noise signal is fed through directional coupler 33, delay line 34 to transmit antenna 35 which directs it to a target of interest. Delay line 34 has a predetermined delay.

The reflected signal from the target of interest is received by antenna 38 which is then passed through traveling wave tube amplifier 39 to isolator 40. The output of isolator 40 is fed to summing tee 41. Simultaneously summing tee 41 receives a reference signal by way of directional coupler 33, attenuator 36, and isolator 37. The output of summing tee 41 is fed to spectrum analyzer 42.

It is again noted that maximum response occurs when the reference signal is equal in magnitude to the reflected signal at the point of summation and that the bandwidth of filter 31 should be at least equal to the ratio of the speed of light divided by the range to the target; otherwise, no modulation of the power spectrum will occur.

In further explanation of the operation, a block diagram of the extended minimum range or zero range spectrum analysis radar is shown in FIG. 3. Aside from the delay line, it is a conventional spectrum analysis radar in which the range to a target is again determined by measuring the frequency difference between the modulation nulls in the power spectrum of the sum signal. No modulations will however be evident if the range to the target is less than the ratio of the speed of light to the bandwidth of the transmitted signal (see equation 30). At this point, the spectrum analysis radar can no longer be used.

But again the power spectrum modulation of the sum signal depends only on the relative delay between the reference signal and the received signal. Therefore, when an artificial delay is introduced between the directional coupler and the transmitting antenna, it will have the effect of delaying the received signal relative to the reference signal. This means that the range to a target as measured by the null pattern will be the sum of the "delayed range" and the "target range." But since the "delayed range" is known, the target range can be determined by measuring the frequency difference between nulls $\Delta fm$ as:

$$\Delta fm = \frac{c}{2(R_\text{T} + R_\text{D})} \qquad (35)$$

where c is the velocity of light, $R_T$ the target range, and $R_D$ the delayed range. Clearly if $R_D$ is made equal to or greater than the reciprocal of the bandwidth of the transmitted signal, the radar will be useful down to zero range.

The delaying mechanism can again be any one of the standard devices such as a delay line or long coaxial cable and can be inserted in any way which will effectively delay the received signal relative to the reference signal. The choice made in FIG. 3 might however be preferred since the signal levels are relatively high on the transmitter side.

In a general manner, while there has been, in the above description, disclosed what is deemed to be practical and efficient embodiments of the invention, it should be well understood that the invention is not limited to the exact structural arrangement and method disclosed, as there might be changes in the structural arrangement, disposition and form of the parts and method without departing from the principles of the present invention as comprehended within the scope of the accompanying claims.

We claim:

1. A spectrum analysis radar system providing zero minimum range comprising means to generate a stationary time signal, means to delay said generated signal for a predetermined time, means to direct said delayed stationary time signal towards a target of interest, means to receive a signal reflected from said target of interest, means to restrict said generated time signal to a predetermined magnitude, means to sum said received signal and said restricted signal to provide as an output therefrom a modulated power spectrum signal having nulls, and means to measure the frequency difference between said nulls to provide target information down to zero range.

2. A spectrum analysis radar system as described in claim 1 further including filter means to limit the bandwidth of said generated stationary time signal to be equal to the ratio of the speed of light divided by the range to said target.

3. A spectrum analysis radar system as described in claim 1 wherein said means to generate a stationary time signal consists of an unmodulated noise generator.

4. A spectrum analysis radar system as described in claim 2 wherein the means to restrict said generated signal is comprised of a directional coupler receiving the filtered signal and an attenuator being fed the output of said directional coupler.

5. A spectrum analysis radar system as described in claim 1 wherein said means to measure consists of a spectrum analyzer receiving the output from said summing means.

6. A spectrum analysis radar system as described in claim 1 further including means to amplify said received signal prior to being fed to said summing means.

7. An extended range spectrum analysis radar system comprising means to generate a stationary time signal, means to direct said generated stationary time signal to a target of interest, means to receive a signal reflected from said target of interest, means to restrict the magnitude of said generated stationary time signal to a predetermined magnitude, means to delay said restricted signal a predetermined time to provide a reference signal, means to sum said reference signal and said received signal to provide as an output therefrom a modulated power spectrum signal having nulls, means to measure the frequency difference between said nulls to provide target information at extended ranges, and filter means to limit and bandwidth of said generated stationary time signal to be equal to the ratio of the speed of light divided by the range to said target.

8. A spectrum analysis radar system as described in claim 7 wherein said means to generate a stationary time signal consists of an unmodulated noise generator.

9. A spectrum analysis radar system as described in claim 7 wherein the means to restrict said generated signal is comprised of a directional coupler receiving the filtered signal and an attenuator being fed the output of said directional coupler.

10. A spectrum analysis radar system as described in claim 7 wherein said means to measure consists of a spectrum analyzer receiving the output from said summing means.

11. A spectrum analysis radar system as described in claim 7 further including means to amplify said received signal prior to being fed to said summing means.

12. A method of providing a minimum range down to zero for a spectrum analysis radar comprising generating a stationary time signal having a bandwidth at least equal to the ratio of the speed of light divided by a preselected delayed range, utilizing a portion of said time stationary signal as a reference signal, directing said time stationary signal towards a target of interest, receiving a signal returned from said target of interest, delaying said received signal relative to said reference signal, summing said delayed received signal and said reference signal to provide a modulated power spectrum output signal having nulls, and measuring the frequency difference between said nulls to provide target information down to said zero minimum range.

13. A method of extending the target range of a spectrum analysis radar comprising generating a stationary time signal having a bandwidth at least equal to the ratio of the speed of light divided by a preselected delayed range, utilizing a predetermined portion of said time stationary signal as a reference signal, directing said time stationary signal towards a target of interest, receiving a signal returned from said target of interest, delaying said reference signal a predetermined time in relation to said received signal, summing said delayed signal and said received signal to provide a modulated power spectrum output signal having nulls, and measuring the frequency difference between said nulls to provide target information of said extended range.